Aug. 22, 1961          E. J. LAWTON          2,997,419
COLD WELDING OF POLYESTER RESINS
Filed Oct. 18, 1956

Inventor:
Elliott J. Lawton,
by Paul A. Frank
His Attorney.

United States Patent Office 2,997,419
Patented Aug. 22, 1961

2,997,419
COLD WELDING OF POLYESTER RESINS
Elliott J. Lawton, Schenectady, N.Y., assignor to General Electric Company, a corporation of New York
Filed Oct. 18, 1956, Ser. No. 616,870
17 Claims. (Cl. 154—126)

This invention relates to a process of welding into an integral piece distinct and separate sections of unsaturated polyester resins which comprises placing separate sections of unsaturated polyester resin in intimate contact with each other and treating the contacted sections with high energy radiation until welding is effected. This invention also relates to welding unsaturated polyester resins to organopolysiloxanes. The term "polyester resin" used hereafter refers to an unsaturated polyester resin.

The features of this invention may best be understood by reference to the following description taken in connection with the accompanying drawing in which.

Figure 1:
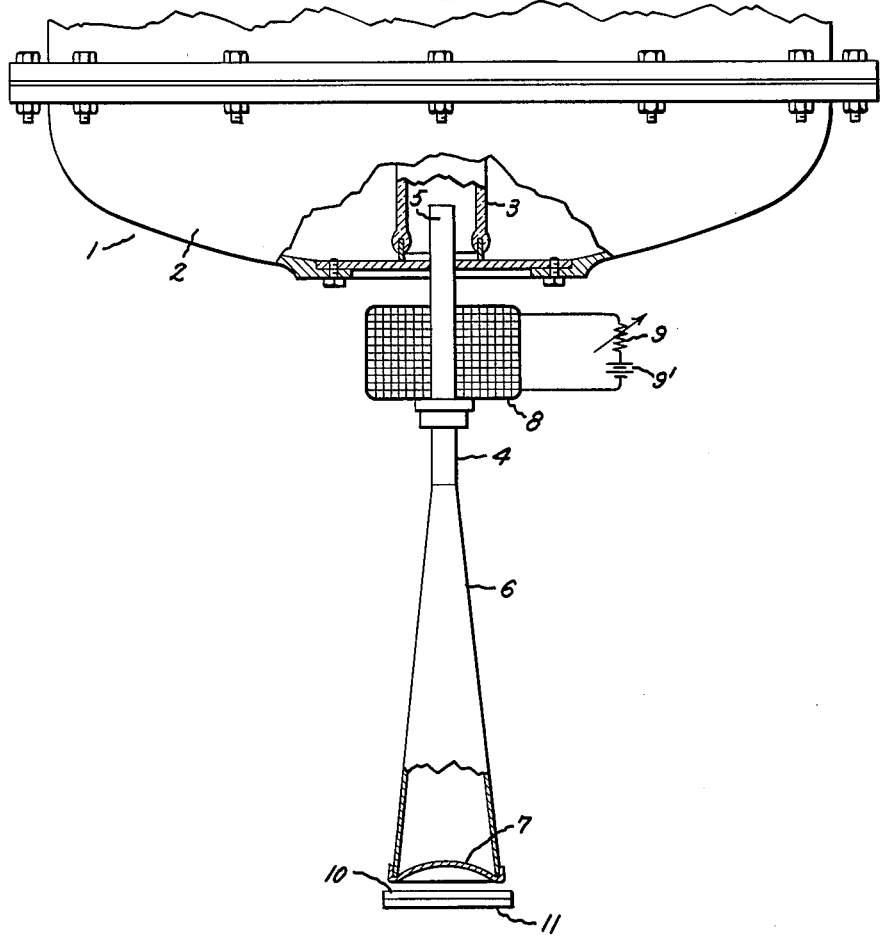
FIG. 1 is a partially sectionalized, simplified view of a high voltage electron accelerating apparatus useful in the practice of the invention.

In patent application Serial No. 291,541, Schmitz et al., filed June 3, 1952, now Patent No. 2,921,006, and assigned to the same assignee as the present application, there is disclosed and claimed a method of polymerizing polyesters without using chemical agents and heat by treating these polyesters with high energy radiation.

In preparing articles of manufacture from polyester resins it is often desirable to weld separate sections in order to make a composite structure thereof; for example, in irradiation, it is simpler and more economical to irradiate thin sections of polymer than to irradiate a bulky preformed article.

I have now discovered a process of welding distinct and separate sections of polyester resins which comprises placing separate sections of polyester resin in intimate contact with each other, and treating the contacted sections with high energy radiation until the sections are welded. This method may also be used to weld sections of filled polyester resin, each containing the same or different fillers.

The fact that partially cured polyester resins can be welded by this process indicates that this process is not a mere sticking together but rather depends on actual welding together to produce a finished product which has substantially the same properties, such as tensile strength, percent elongation, etc. as if the material had been cured in one piece. This welding effect with polyester resins is quite unexpected since I have found that not all polymers capable of being cross-linked with high energy ionizing radiation can be welded with such radiation, for example, polyethylene, nylon, Mylar, etc. which can be cross-linked with high energy ionizing radiation cannot be welded with even larger doses of high energy, ionizing radiation. The ability to cold weld is further unexpected since polymer welding is usually carried out at elevated temperatures.

Since most of the polyester compositions employed in this invention are liquid prior to polymerization and cross-linking, it is necessary to partially cure these compositions prior to welding in order to be able to handle the materials as solids. Thus, after partially curing the materials to the desired degree, they can be handled conveniently as thin sheets which can be welded according to this invention.

A suitable polyester resin can be prepared from a mixture of (1) a polyester having a plurality of polymerizable reactive alpha,beta enal groups (i.e.

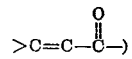

for example, a polyester of α,β-unsaturated polycarboxylic acids and a polyhydric alcohol, such as glycol also refered to "alkyds" or "unsaturated alkyds," but more particularly as "α,β-ethylenically unsaturated alkyd resins," and (2) a compound which contains polymerizable $CH_2\!\!=\!\!C\!<$ groups also referred to as a "vinyl monomer." As a general rule the compounds within (1) and (2) are mutually soluble without the use of any other solvent, although solvents can be used if desired.

Alkyd resins copolymerizable with vinyl monomers, such as styrene, in accordance with this invention are those which contain a plurality of alpha,beta enal groups. The simplest resins of this group are those produced by the esterification of an alpha, beta-unsaturated dicarboxylic organic acid with a polyhydric alcohol.

Among the useful dihydric alcohols are those which contain either primary hydroxyl groups or secondary hydroxyl groups since they are more rapidly esterified, with glycols being generally preferable. The particular choice of glycol is covered by the fact that when it is incorporated into the alkyd, the alkyd can be copolymerized with vinyl monomers to form a partially cured gel which can later be further polymerized to an infusible solid. Among the suitable dihydric alcohols are diethylene glycol, dipropylene glycol, neopentyl glycol, triethylene glycol, tetraethylene glycol, etc., the preferable glycols being ethylene glycol, propylene glycol, and mixtures thereof.

Although the use of maleic or fumaric acids is preferred, other alpha, beta unsaturated dicarboxylic organic acids which can also be used in preparing the alkyd resins are itaconic, citraconic, mesaconic acids, etc., and any of the foregoing acids could be substituted in part with other monocarboxylic olefinic acids such as acrylic, methacrylic, cinnamic, etc acids. Small quantities of tricarboxylic acid as well as trifunctional inorganic acids or esters can also be used. Obviously various mixtures of these acids can also be used.

The alkyd resins may be modified with other substances which are often used in alkyd resins, i.e., monohydric alcohols, monabasic acids or dibasic acids, e.g., phthalic acid, succinic acid, glutaric acid, adipic acid, azelaic acid, sebacic acid, etc., which do not contain groups polymerizably reactive with the vinyl monomer. These modifying agents are usually used as diluents or plasticizers, chemically combined in the resin to improve the mechanical properties of the resins.

The alkyd resins may be prepared from a controlled amount of polyhydric alcohols other than the glycols or from mixtures including a glycol and a controlled amount of a higher polyhydric alcohol. Examples of these are glycerol, pentaerythritol, etc.

It is also possible to introduce initially into the alkyd resin a certain number of groupings of the $CH_2\!\!=\!\!C\!<$ type through the use of olefinic compounds. One way of accomplishing this, for example, is by direct esterification of an unsaturated alcohol containing a $CH_2\!\!=\!\!C\!<$ group. Examples of such alcohols are allyl and methallyl alcohols.

The alkyd resins of this invention may be modified in the same general manner as other alkyd resins. However, if a monohydric alcohol or a dibasic acid which does not contain polymerizable olefinic groups is used, the proportion of such substances should not be so high as to avoid gelation and later solidifications. By the use of a relatively large proportion of an unsaturated dibasic acid, e.g., maleic, in the alkyd resin, a harder and tougher polymer is produced upon subsequent copolymerization with the vinyl monomer. On the other hand, if the alkyd resin is obtained from a relatively small proportion of polymerizably active dibasic acid and a relatively large proportion of acids which do not contain groups polymerizably reactive with the vinyl monomer, a softer and more flexible resin results upon polymerization. The same effect is produced by the introduction of other inactive ingredients. By varying the ingredients and the proportions of the ingredients, resins may be obtained having properties which one desires in the final resin.

The resins should be so formulated that the carboxyl groups of the acids are reacted with theoretical molal equivalents of the hydroxy groups of the alcohols. In calculating equivalents, modifying carboxylic acids as well as modifying alcohols should be considered. In this way low acid numbers can be obtained. However, the final acid number preferably should be so adjusted that it is no higher than 50 and generally no higher than 100.

Well-known practices which are usually employed in the preparation of alkyd resin can advantageously be employed in preparing the alkyd resins of this invention. For example, since these resins are sensitive to oxygen, the alkyds can be prepared in contact with such inert gases as carbon dioxide or nitrogen which can also affect agitation and aid in removal of water and the unreacted ingredients.

One of the difficulties in using the polymer composition comprising a vinyl monomer and the alkyd resin described above is that it is difficult to store in the mixed form because polymerization may take place even at room temperature within a comparatively short time to the insoluble, infusible state. Moreover, when it is desired to polymerize these compositions according to this invention, the reaction may become so vigorous that it cannot be controlled. To overcome these difficulties it is advisable to incorporate a small proportion of a polymerization inhibitor in the polymer composition.

A wide variety of well-known polymerization inhibitors may be used. Although copper salts, such as copper naphthenate are preferred, other suitable polymerization inhibitors are aromatic compounds, especially the polyhydric phenols and aromatic amines. Specific examples of this group of inhibitors are tertiary butyl catechol, hydroquinone, benzaldehyde, resorcinol, tannin, sym-dibeta naphthyl p-phenylene diamine, phenolic resins, etc. It has been found that the combination of hydroquinone and copper salts makes an excellent inhibitor system.

The concentration of inhibitor based on weight of resin is preferably low and less than about 1% is usually sufficient. However, with the preferred inhibitor, the use of only about 0.05% to about 0.1%, based on weight of total resin composition is preferred.

The vinyl monomer employed as components of the polyester resins are employed to provide cross-links between the unsaturated polyester chains thereby rendering the resinous compositions insoluble and infusible. These monomers are usually liquids, soluble in the polyester component of the resin, copolymerizable with the polyester and are represented by the general formula:

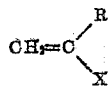

where R is hydrogen, alkyl, e.g., methyl, ethyl, propyl, etc. radical, and the like, and X is a hydrocarbon radical, e.g., methyl, ethyl, phenyl, etc. or a negative group, e.g., —CN, —COOH, —CONH$_2$, —CONHR$^1$, —CONR$_2^1$, —COR$^1$, —COOR$^1$, —CHO, —OCOR$^1$ and ether radicals, e.g. —OR$^1$, wherein R$^1$ is an alkyl or aryl radical. These monomers usually comprise 15–50% but preferably 25 to 35% by weight of the total polyester-vinyl monomer mixture. These vinyl monomers include the vinyl carboxylates or precursors thereto, e.g., those wherein the vinyl group is in the acid portion of the molecule, such as acrylic acid and its esters, e.g., methyl acrylate, ethyl acrylate, n-butyl acrylate; acrylonitrile, methylacrylonitrile; the α-alkyl acrylates such as methacrylic acid and ethacrylic acid and their esters such as methyl, n-propyl, n-butyl, isopropyl and cyclohexyl meth- and ethacrylates and the like; alpha-substituted acrylic acids and esters thereof, such as ethyl α-cyanoacrylate, and the like; those vinyl components wherein the vinyl group is in the nonacid portion of the molecule, such as the vinyl esters, e.g., vinyl acetate, vinyl trimethylacetate, vinyl propionate, vinyl benzoate and the like; vinyl hydrocarbons, e.g., the vinyl aryls, such as styrene, vinyl toluene, and the like. Of these monomers, because of their relatively high rates of polymerization, the vinyl aryls and/or esters of acrylic and alpha-substituted acrylic acids with solely hydrocarbon mono-alcohols of no more than 6 carbons and particularly the lower alkanols of 1 to 4 carbon atoms, are preferred. Styrene and the alkyl hydrocarbon substituted acrylic acids wherein the alkyl groups contain 1 to 4 carbon atoms are particularly preferred. An excellent description of styrene-polyester resin is found in Schildnecht "Vinyl and Related Polymers," pp. 75–81, John Wiley & Sons, N.Y. (1952).

These polyester resins may be compounded with 0 to 200 parts, but preferably 30 to 100 parts of various finely divided fillers per 100 parts of polyesters. However, the amount of filler that can be compounded for optimum properties depends on the particular filler and the particle size of the filler. In general, a larger amount of coarse filler can be compounded with the polyester than a fine filler. Examples of fillers comprise silica, silica aerogel, fumed silica, titanium dioxide, calcium silicate, ferric oxide, chromic oxide, cadmium sulfide, asbestos, glass fibers, alumina, calcium carbonate, carbon black, lithopone, talc, etc. In addition to the above silicas, hydrophobic silicas can also be used. Examples of those silicas which have been rendered hydrophobic by chemical treatment are the alcohol surface-esterified type described in U.S. Patent 2,657,149, Iler; silicas which have been treated with various alkyl chlorosilanes in the manner of Patents 2,510,661, 2,563,555, both granted to Safford and assigned to the same assignee as the present invention, 2,584,085, Stross; those silicas treated in the manner of Bueche et al., application Serial No. 531,829, filed August 31, 1955, and assigned to the same assignee as the present application. In addition, other modifying agents, such as dyes, pigments, stabilizers, plasticizers, antioxidants, etc. can also be used without departing from the scope of the invention.

In the drawing there is shown high voltage accelerating apparatus 1 capable of producing a beam of high energy electrons for welding polyester resins in accordance with the invention. High voltage accelerating apparatus 1 may be of the type disclosed in Patent 2,144,518, Westendorp, assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 17, pp. 128–133 (December 1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross-section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

Figure 2:
FIG. 2 is a view of two sections of polyester resin capable of being welded according to this invention.

In practicing this invention, two separate and distinct sections of polyester resins are joined together by placing the sections in intimate contact with each other. Two sheets, 10 and 11, are placed in intimate contact with each other as shown in FIG. 1. Alternately, 10 and 11 can be placed side by side but in intimate contact as shown in FIG. 2. These are supported in the path of the electrons emerging from end-window 7 as illustrated. The high energy electrons penetrate the contacted materials to a depth dependent upon their energy and weld the individual pieces. Of course, the sheets can be in the form of an intimately superimposed strip material which is passed continuously under end-window 7 at a velocity selected to give the desired irradiation dosage. In addition to welding sheet materials sections of various shapes (e.g., bottles, cups, tubing, filaments, pipes, etc.) can be welded according to this invention. Uniform treatment of polymeric materials having appreciable thickness can be assured by irradiating them first from one side and then the other or in some cases from both sides simultaneously. In certain instances, it may be desirable to irradiate the polymeric materials in an atmosphere of nitrogen, argon, helium, krypton, or xenon, etc., to prevent any damaging effect of any corona which may be present.

The most commonly employed units for measuring high energy radiation are (1) Roentgen units and (2) Roentgen equivalent physical units. Roentgen units are commonly used to measure gamma and X-rays and as usually defined are the amount of radiation that produces one electrostatic unit of charge per millimeter of dry air under standard conditions. The Roentgen equivalent physical unit (the "rep.") is a convenient unit in common use to describe the radiation dose from other than gamma or X-rays, and is the measure of the ionization in the absorber or tissue. The ionization produced by primary radiation is expressed as one rep. when the energy lost in tissue is equivalent to the energy lost by the absorption of one Roentgen of gamma or X-rays in air. Further definitions of "Roentgen" and "rep." can be found on p. 256 of "The Science of Engineering of Nuclear Power," edited by Clark Goodman (1947), and on p. 436 of "Nuclear Radiation Physics" by Lapp and Andrews (1948). For convenience the term "Roentgen equivalent physical" or "rep." will be used in the specification and appended claims.

The irradiation can be carried out below room temperature, at room temperature or at elevated temperatures.

It will be readily realized that other forms of electron accelerating apparatus may be employed instead of high voltage apparatus 1, for example, linear accelerators of the type described by J. C. Slater in the "Reviews of Modern Physics," vol. 20, No. 3, pp. 473–518 (July 1948), may be utilized. To decrease wasteful energy absorption between the point of exit of electrons from the accelerating apparatus and the polymeric materials, a vacuum chamber having thin entrance and exit windows may be inserted in the space.

In general, the energy of the irradiation advantageously employed in the practice of my invention may range from about 50,000 to 20 million electron volts or higher depending upon materials. The preferable range is 100,000 to 10 million electron volts. Although high energy electron irradiation is preferred since it produces a large amount of easily controllable high energy ionizing radiation within a short period of time without rendering the product radioactive, many other sources of high energy ionizing radiation can also be used in my invention. Examples of such ionizing radiation sources are gamma rays, such as can be obtained from $Co^{60}$, "burnt" uranium slugs, fission by-products, such as waste solution, separated isotopes, such as $Cs^{137}$, gaseous fission products liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, neutrons, $\alpha$-particles, fission fragments, such as are available from cyclotrons, etc.

Welding depends on total dose of irradiation employed rather than on the rate of dose. The actual dose required for the welding operation depends on the specific type of polyester employed, the degree to which the polyester resin has already been cured, etc. In practice total doses of at least $1 \times 10^6$ rep., for example, from $1.0 \times 10^6$ to $50 \times 10^6$ rep. or higher, but preferably from $2 \times 10^6$ to $15 \times 10^6$ rep. can be employed to complete the cure. In welding partially cured sections to obtain strong welds, it is preferable that each section should not be partially cured with more than $2 \times 10^6$ rep. prior to welding and completing the cure. However, one section may be cured to a higher dose if the other section is uncured or only slightly cured.

In order that those skilled in the art may better understand how the present invention may be practiced, the following examples are given by way of illustration and not by way of limitation.

The apparatus employed was that described in FIG. 1 with 800 kvp. electrons (kvp. refers to the peak voltage in kilovolts generated by the inductance coil with high voltage apparatus 1 during the conducting half cycle, and thus is the measure of energy of electrons emerging from window 7). All parts are by weight.

EXAMPLE 1

An unsaturated alkyd was prepared by esterifying 1 mole of maleic anhydride, 0.55 mole of phthalic acid and an excess of propylene glycol (2 moles) and 0.5 mole of toluene as azeotropic agent in the presence of 0.5 gram of p-toluene sulfuric acid as catalyst. Heating was carried on for 16 hours in such a manner that the hot vapors passed through a bubble cap fractionating column before condensing. The water was separated and the other components returned to the reaction. The reaction mixture was then heated in a low vacuum to remove the low boiling constituents and was finally heated at 180–200° C. under a pressure of less than 4 mm. for about 2 hours. The washed product was a viscous polyester having a low acid number (less than 35).

An alkyd-vinyl monomer composition curable to an infusible solid was prepared by mixing 30 parts of styrene with 70 parts of the above prepared alkyd.

EXAMPLE 2

Another unsaturated alkyd was prepared in the manner of Example 1 by esterifying 1 mole of maleic anhydride, 0.55 mole of diglycollic acid and 2 moles of propylene glycol to produce a viscous polyester having a low acid number (less than 35). An alkyd-vinyl monomer composition curable to an infusible solid was prepared by mixing 30 parts of styrene with 70 parts of the above alkyd.

The styrene-alkyd compositions of Examples 1 and 2 could be partially cured to a solid by irradiating a thin layer thereof. This was done by painting the liquid resin on a surface from which the cured solid can be removed, exposing to high energy radiation, and removing the material in the form of a sheet.

Sections of alkyd resin were then placed in intimate contact with each other by placing one upon the other and irradiating. The welding dose employed was $10 \times 10^6$ rep. The results are presented in Table I. Where 0 is indicated as the initial cure, the liquid styrene-alkyd solution was painted on the polyester resin.

Table I

| Ex. | Material I | | Material II | | Remarks |
|---|---|---|---|---|---|
| | Polyester | Initial Cure (rep) | Polyester | Initial Cure (rep) | |
| 3 | Ex. 1 | 0 | Ex. 1 | $2 \times 10^6$ | strong weld. |
| 4 | Ex. 1 | 0 | Ex. 1 | $3 \times 10^6$ | Do. |
| 5 | Ex. 1 | 0 | Ex. 1 | $4 \times 10^6$ | weak weld. |
| 6 | Ex. 1 | $1 \times 10^6$ | Ex. 1 | $1 \times 10^6$ | strong weld. |
| 7 | Ex. 1 | $1.5 \times 10^6$ | Ex. 1 | $1.5 \times 10^6$ | fair weld. |
| 8 | Ex. 1 | $2 \times 10^6$ | Ex. 1 | $0.5 \times 10^6$ | Do. |
| 9 | Ex. 2 | $2 \times 10^6$ | Ex. 2 | 0 | strong weld. |

In addition to being able to weld polyesters by the use of high energy radiation I have also succeeded in welding polyesters to organopolysiloxanes.

EXAMPLE 10

A methyl polysiloxane gum was prepared by heating octamethylcyclotetrasiloxane with 0.01% KOH for about 6 hours to produce a gum having a viscosity of about $1 \times 10^6$ centipoises. The product is referred to as "gum."

Sections of gum and polyesters were placed in intimate contact with each other by placing one upon the other and irradiating. The welding dose employed was $10 \times 10^6$ rep. The results are given in Table II. Where 0 is indicated as the dose of the polyester cure, the liquid styrene-alkyd solution was painted on the gum. In the last example of Table II (20) the two initially cured materials were painted with uncured polyester (Ex. 1) before welding. The parts of filler designated in Table II are parts based on 100 parts of polymer. The silica employed is Santocel-C, Monsanto Chemical Co. and the carbon black, SAF Black, Phillips Petroleum Company.

Table II

| Ex. | Material I—Organopolysiloxane | | Material II—Polyester | | Remarks |
|---|---|---|---|---|---|
| | Parts Filler | Initial Cure (rep) | Source | Initial Cure (rep) | |
| 11 | 40 Carbon Black | 0 | Ex. 1 | 0 | strong weld. |
| 12 | do | 0 | Ex. 1 | $0.5 \times 10^6$ | Do. |
| 13 | do | 0 | Ex. 1 | $1.0 \times 10^6$ | fair weld. |
| 14 | do | $2.0 \times 10^6$ | Ex. 1 | 0 | strong weld. |
| 15 | do | $3.0 \times 10^6$ | Ex. 1 | 0 | weak weld. |
| 16 | 40 Silica | 0 | Ex. 1 | 0 | strong weld. |
| 17 | do | 0 | Ex. 1 | $0.5 \times 10^6$ | Do. |
| 18 | do | 0 | Ex. 1 | $1.0 \times 10^6$ | fair weld. |
| 19 | do | $0.5 \times 10^6$ | Ex. 1 | 0 | strong weld. |
| 20 | 40 Carbon Black | $2.0 \times 10^6$ | Ex. 1 | $2.0 \times 10^6$ | Do. |

In welding previously cured section to obtain strong welds, it is preferable that each section should not be cured excessively prior to welding. Thus, in Example 7 it is noted that precuring material 1 and material 2 to $1.5 \times 10^6$ rep. produces a weaker weld than one cured to $1.0 \times 10^6$ rep. (Example 6). One section may be cured to a higher dose if the other section is uncured or only slightly cured. However, the maximum pre-welding dosage will vary with each specific polyester and organopolysiloxane.

The unexpectedness of this invention is illustrated by the fact that other polymers capable of being cured by high energy, ionizing radiation cannot be welded by this process. Attempts to weld together other polymers was unsuccessful. In these examples two thin sections having a thickness of about 5 mils were placed upon each other and irradiated at room temperature with $10 \times 10^6$ rep. The polymers used and the results obtained are disclosed in Table III.

Table III

Polymer-polymer combinations that do not weld together at $10 \times 10^6$ rep. at room temperature:

| Example: | | |
|---|---|---|
| 21 | Nylon to Nylon | No weld. |
| 22 | Polyethylene to Polyethylene | Do. |
| 23 | Nylon to Polyethylene | Do. |
| 24 | "Mylar" to "Mylar" | Do. |

Nylon employed in the above examples was nylon 66; polyethylene, Alathon I, Du Pont de Nemours & Co., and Mylar (a terephthalic acid-ethylene glycol polymer) sold by Du Pont de Nemours & Company.

Although this invention has been illustrated with methylpolysiloxanes, particular polyesters, carbon black and silica fillers, other organopolysiloxanes, polyesters fillers such as those disclosed herein can also be employed. In addition, organopolysiloxanes partially to moderately cured with chemical curing agents, such as peroxides, can be joined together by this invention where the presence of such curing agents in the final product does not interfere with the intended use.

Since silicones and polyesters are good electrical insulators, the process of my invention can be applied to the insulation of electrical conductors. One method of preparing such insulated conductors comprises (1) partially curing a polyester or a polyester-organopolysiloxane tape, (2) wrapping the partially cured tape around a conductor to be insulated, and (3) treating this wrapped conductor with high energy, ionizing radiation until the individual sections of tape are welded together to form an integral insulation. Since the tape is only partially cured prior to irradiation, it readily conforms to the irregular contours of the conductor, thus producing a cured coating after irradiation which is substantially moisture-proof and free of air voids. Welding with radiation seals the tape together to form a continuous integral coating over the conductor which prevents moisture attack on the underlying insulation. The process can be carried out so that the conductor is wrapped and irradiated continuously. The partially cured tapes may be either backed with such material as paper, cloth, or other resin or unbacked depending on the desired mechanical strength. The backing material can also comprise one polymer containing one type of filler while the inside polymer contains another filler. The tape can also contain fibers such as reinforcing strands or mesh or various natural or synthetic materials such as nylon, dacron, orlon, glass cloth, natural fibers such as cotton, silk wool, etc. to give it added tear and handling strength, etc. One method of preparing such tapes containing reinforcing mesh is by coating the mesh with liquid polyesters or by sandwiching the mesh between two polyester layers and pressing them together. Strands of fiber can be mixed into the polyester or the liquid polyester can be applied to a mat of these materials. By choosing proper electron voltage one can obtain a tapered cure throughout the thickness of a single layer, for example, the outside layer could have a $2 \times 10^6$ cure with the dose diminishing or tapering to zero cure at the opposite side.

EXAMPLE 25

A mixture of 100 parts of the organopolysiloxane (Ex.

10) with 40 parts of finely divided silica is compounded, and a 5 mil tape prepared from this mixture. This tape is then painted on one side with the alkyd resin prepared in Example 1 and irradiated with $0.5 \times 10^6$ rep. This partially irradiated tape is wrapped around a copper wire with the polyester material on the inside and irradiated to a dose of $4 \times 10^6$ rep. to produce an excellent integral insulating coating on the wire which coating conforms to the irregularities of the wire, is substantially free of moisture and air voids, and thus has enhanced resistance to corona.

The compositions of this invention can also be used in any of those applications in which polyester compositions are now being used, for example as casting, laminating resins, etc. For example, sheets of polyester resins can be welded according to this process and used in packaging, etc. In addition, the polyester can be used to impregnate glass, asbestos fibers, natural or synthetic fibers, and the like, and these materials welded according to this invention. Sections of these impregnated fibers and cloths can be bonded and welded to form laminates useful in electrical insulation, in table tops, etc.

This process is particularly useful in welding organopolysiloxanes to polyesters. Articles of manufacture prepared of organopolysiloxane and polyester according to this invention can be used in applications where a rigid structure is desired which still has an outer surface possessing the properties characteristic of silicone, such as in electrical insulation, water repellent coatings, etc.

What I claim as new and desire to secure by Letters Patent of the United States is:

1. A process of welding distinct and separate sections of polyesters, at least one of said sections being self-supporting, into an integral piece without the use of an intermediate layer which comprises placing separate sections of $\alpha,\beta$-ethylenically unsaturated alkyd resins in intimate and direct contact with each other prior to their being cured to the insoluble, infusible state, and treating the contacted sections with high energy ionizing radiation until welding is effected.

2. The process of claim 1 wherein the sections are partially cured prior to assembling and welding.

3. The process of claim 1 wherein only one section is partially cured prior to assembling and welding.

4. A process of welding distinct and separate sections of unsaturated polyesters and organopolysiloxanes into an integral piece without the use of an intermediate layer which comprises placing separate sections of $\alpha,\beta$-ethylenically unsaturated alkyd resin and organopolysiloxane in intimate and direct contact with each other prior to their being cured to the insoluble, infusible state, and treating the contacted sections with high energy ionizing radiation until welding is effected.

5. The process of claim 4 wherein the sections are partially cured prior to assembling and welding.

6. The process of claim 4 wherein only one section is partially cured prior to assembling and welding.

7. A process of preparing an insulated electrical conductor which comprises wrapping a conductor with an organopolysiloxane tape coated on one side with an $\alpha,\beta$-ethylenically unsaturated alkyd resin said tape having been partially cured with high energy, ionizing radiation, and subsequently completing the cure by treating the wrapped conductor with additional high energy, ionizing radiation.

8. The product produced by the process of claim 7.

9. The process as in claim 1 wherein the high energy ionizing radiation is high energy electrons.

10. The process as in claim 9 wherein the total irradiation dose in which the welded sections are subjected is the range of $1 \times 10^6$ to $50 \times 10^6$ rep.

11. The process as in claim 10 wherein the energy of the high energy electrons is in the range of 0.05 to 20 million electron volts.

12. The process as in claim 4 wherein the high energy ionizing radiation is high energy electrons.

13. The process as in claim 12 wherein the total radiation dose used in welding the sections is in the range of $1 \times 10^6$ to $50 \times 10^6$ rep.

14. The process as in claim 13 wherein the high energy electrons have an energy of 0.05 to 20 million electron volts.

15. The process of preparing an insulated electrical conductor which comprises wrapping a conductor with an organopolysiloxane tape coated with an $\alpha,\beta$-ethylenically unsaturated alkyd resin, said tape having been partially cured by the use of high energy electrons to an irradiation dose of $0.5 \times 10^6$ to $2 \times 10^6$ rep., and subsequently completing the cure by treating the wrapped conductor with additional high energy electrons to a total irradiation dose not exceeding substantially $50 \times 10^6$ rep.

16. A process as in claim 15 wherein the high energy electrons have an energy in the range of 0.05 to 20 million electron volts.

17. A process of welding distinct and separate sections into an integral piece without the use of an intermediate layer, which comprises placing at least one section comprising an $\alpha,\beta$-ethylenically unsaturated alkyd resin in intimate and direct contact with at least one section comprising a member selected from the class consisting of $\alpha,\beta$-ethylenically unsaturated alkyd resins and organopolysiloxanes prior to said sections being cured to the insoluble, infusible state, and treating the contacted sections with high energy, ionizing radiation until welding is effected.

References Cited in the file of this patent

UNITED STATES PATENTS

| | | |
|---|---|---|
| 2,367,670 | Christ | Jan. 23, 1945 |
| 2,643,964 | Smith-Johannsen | June 30, 1953 |
| 2,668,133 | Brophy et al. | Feb. 2, 1954 |
| 2,695,853 | Foreit | Nov. 30, 1954 |
| 2,715,363 | Hoover | Aug. 16, 1955 |
| 2,721,821 | Hoover | Oct. 25, 1955 |
| 2,763,609 | Lewis et al. | Sept. 18, 1956 |
| 2,766,220 | Kantor | Oct. 9, 1956 |
| 2,769,742 | Helbing | Nov. 6, 1956 |
| 2,774,697 | Koblitz | Dec. 18, 1956 |
| 2,789,155 | Marshall et al. | Apr. 16, 1957 |
| 2,792,324 | Daley et al. | May 14, 1957 |

OTHER REFERENCES

Brookhaven National Laboratory, Progress Report on Fission Products Utilization VIII, May 1956, page 12.